United States Patent [19]
Derby et al.

[11] Patent Number: 6,154,810
[45] Date of Patent: Nov. 28, 2000

[54] SYSTEM AND METHOD FOR UTILIZING THE MEMORY OF A PORTABLE COMPUTER AS A DISK CACHE WHILE IN SCSI TARGET MODE

[75] Inventors: Herbert G. Derby, Boulder Creek; Cameron J. Esfahani, Sunnyvale; David R. Falkenburg, San Jose, all of Calif.

[73] Assignee: Apple Computer, Inc., Cupertino, Calif.

[21] Appl. No.: 08/520,242

[22] Filed: Aug. 28, 1995

[51] Int. Cl.[7] .............................. G06F 12/00; G06F 13/00
[52] U.S. Cl. ........................... 711/113; 711/118; 709/227
[58] Field of Search ..................... 395/440, 448, 395/457, 281, 284; 361/683; 364/708.1; 711/113, 121, 130, 118; 710/101; 709/217, 229, 227

[56] References Cited

U.S. PATENT DOCUMENTS

| | | | |
|---|---|---|---|
| 4,941,845 | 7/1990 | Eppley et al. | 439/505 |
| 5,133,060 | 7/1992 | Weber et al. | 395/440 |
| 5,499,378 | 3/1996 | McNeill, Jr. et al. | 395/500 |
| 5,522,054 | 5/1996 | Gunlock et al. | 395/439 |
| 5,526,493 | 6/1996 | Shu | 710/101 |
| 5,530,960 | 6/1996 | Parks et al. | 395/825 |
| 5,548,788 | 8/1996 | McGillis et al. | 395/851 |
| 5,574,736 | 11/1996 | Bandy | 371/40.4 |
| 5,581,724 | 12/1996 | Belsan et al. | 395/441 |
| 5,586,291 | 12/1996 | Lasker et al. | 395/440 |
| 5,596,728 | 1/1997 | Belmont | 395/281 |
| 5,623,630 | 4/1997 | Kisuki | 395/468 |
| 5,625,829 | 4/1997 | Gephardt et al. | 395/284 |
| 5,627,974 | 5/1997 | Watts, Jr. et al. | 395/281 |
| 5,689,402 | 11/1997 | Ralston, Jr. | 361/686 |
| 5,729,682 | 3/1998 | Marquis et al. | 709/229 |

OTHER PUBLICATIONS

John Goodman et al., Memory Management for All of Us, Deluxe Edition, SAMS Pub, Div of Prentice Hall Comp. Pub., 1993, First Edition, pp 526–545 and pp1045–1059.

*Primary Examiner*—Do Hyun Yoo
*Assistant Examiner*—Hong Kim
*Attorney, Agent, or Firm*—Sawyer Law Group LLP

[57] ABSTRACT

A system and method for increasing the speed and resource utilization of a computer system in which a personal computer uses a portable computer as an extra hard disk. While the portable computer is in SCSI target mode, the unused memory of the portable computer is converted into a disk cache for the hard disk of the portable computer. This enables the portable computer to perform as a very fast disk.

30 Claims, 3 Drawing Sheets

6,154,810

SYSTEM AND METHOD FOR UTILIZING THE MEMORY OF A PORTABLE COMPUTER AS A DISK CACHE WHILE IN SCSI TARGET MODE

FIELD OF THE INVENTION

The present invention relates to a system and method for increasing the speed and resource utilization in a portable computer while the portable computer is in SCSI target mode, and more particularly to a system and method for utilizing the memory of the portable computer as a disk cache.

BACKGROUND OF THE INVENTION

Portable computers are small in size, light enough to be carried from place to place, and are usually operated by an internal battery. Portable computers provide displays, hard disk storage and the ability to run main-stream programs. Typically, portable computers are used primarily to provide the function of a complete personal computer (PC). However, portable computers may also be used to expand the storage capacity of a PC by acting as an extra hard disk. This is accomplished by connecting the portable computer to the personal computer via a small computer system interface (SCSI) bus and placing the portable computer into SCSI target mode. SCSI target mode is a mode in which a device accepts and implements SCSI commands.

Although a hard disk is a large storage device, it is also a comparatively slow device. Therefore, when a PC uses a portable computer in SCSI target mode, significant delays may be encountered in accessing information from the portable computer.

Accordingly, what is needed is a system and method for increasing the speed and resource utilization of a computer system in which a PC uses a portable computer in SCSI target mode. The present invention addresses such a need.

SUMMARY OF THE INVENTION

The present invention provides a method and system for increasing the speed and resource utilization of a computer system in which a first computer uses a second computer as an extra hard disk. The system and method comprises a first computer coupled to a second computer. The second computer includes a memory and a hard disk, the second computer for storing data from the first computer into the hard disk and for transferring requested data from the hard disk to the first computer. The system and method further comprises program means for converting the unused memory of the second computer into a disk cache, thereby reducing the response time of the computer system.

According to the system and method disclosed herein, the present invention enables the second computer to perform as a very fast disk.

DESCRIPTION OF THE INVENTION

The present invention relates to increasing the resource utilization of a portable computer while in SCSI target mode. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
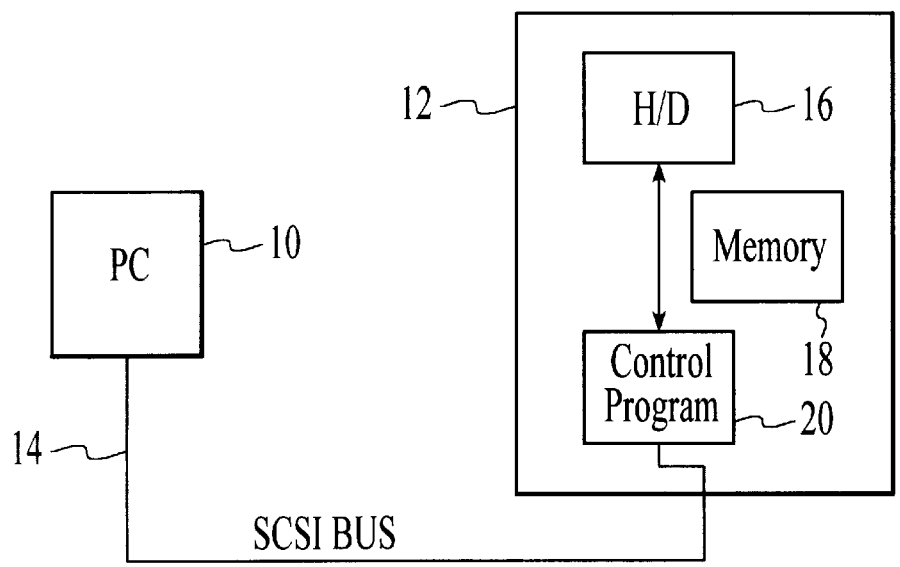
FIG. 1 is a block diagram of a PC and a conventional portable computer in SCSI target mode.

FIG. 1 is a block diagram of a PC 10 and a conventional portable computer 12 while the portable computer 12 is in SCSI target mode. The PC 10 is connected to the portable computer 12 via a SCSI bus 14, and the portable computer 12 includes a hard disk 16, a memory 18, and a disk control program 20. In this configuration, the PC 10 is the SCSI master that sends SCSI commands to the portable computer via the SCSI bus 14 for storing and retrieving data from the hard disk 16. The disk control program 20 is the portable computer's SCSI bus interface for reading the SCSI commands from the SCSI bus 14 during SCSI target mode, and for transmitting data back to the PC 10 via the SCSI bus 14.

Figure 2:
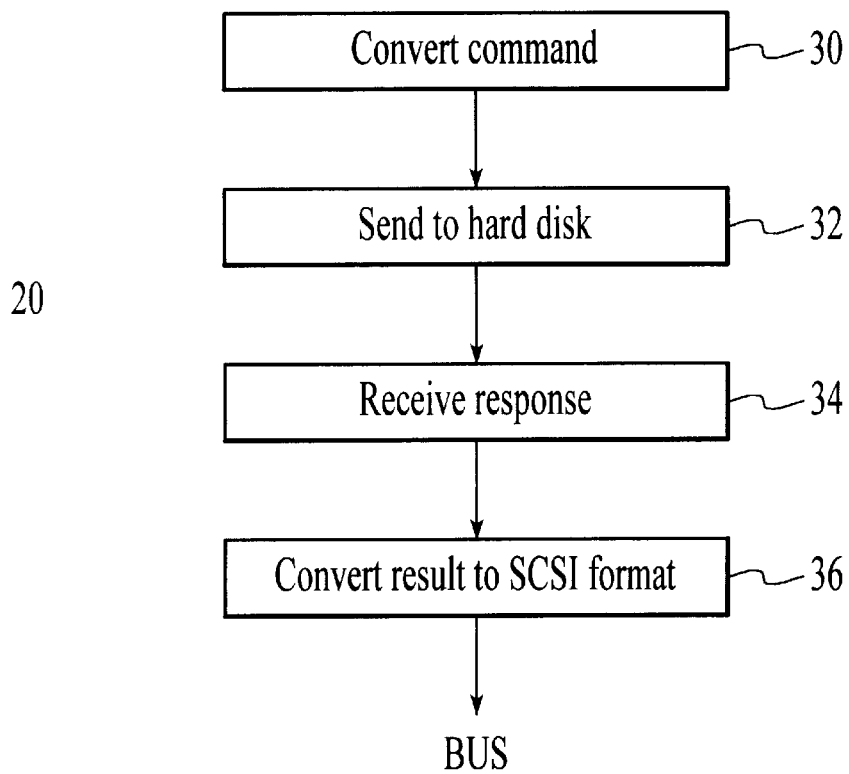
FIG. 2 is a flow chart of a conventional disk control program.

FIG. 2 is a flow chart of a conventional disk control program 20. Referring to both FIGS. 1 and 2, after reading the SCSI commands from the SCSI bus 14, the SCSI commands are converted from SCSI format into an integrated drive electronics (IDE) format of the hard disk 16 in step 30. The IDE commands are then sent to the hard disk 16 for execution in step 32, and after a brief delay, the disk control program 20 receives a response from the hard disk 16 in step 34. If the SCSI command was a write command, then data is written to the hard drive 16. If the SCSI command was a read command, then the requested data is retrieved from the hard drive 16. The disk control program 20 then converts the data retrieved from the hard drive 16 into SCSI format in step 36, and places the data on the SCSI bus for transmission to the PC 10.

The hard disk 16 is a relatively slow storage device, and although the hard disk 16 includes an internal cache (not shown) of approximately 128k, the internal cache only provides a limited amount of caching. A valuable resource in the portable computer 12, the memory 18, is unused while the portable computer 12 is in SCSI target mode.

Figure 3:
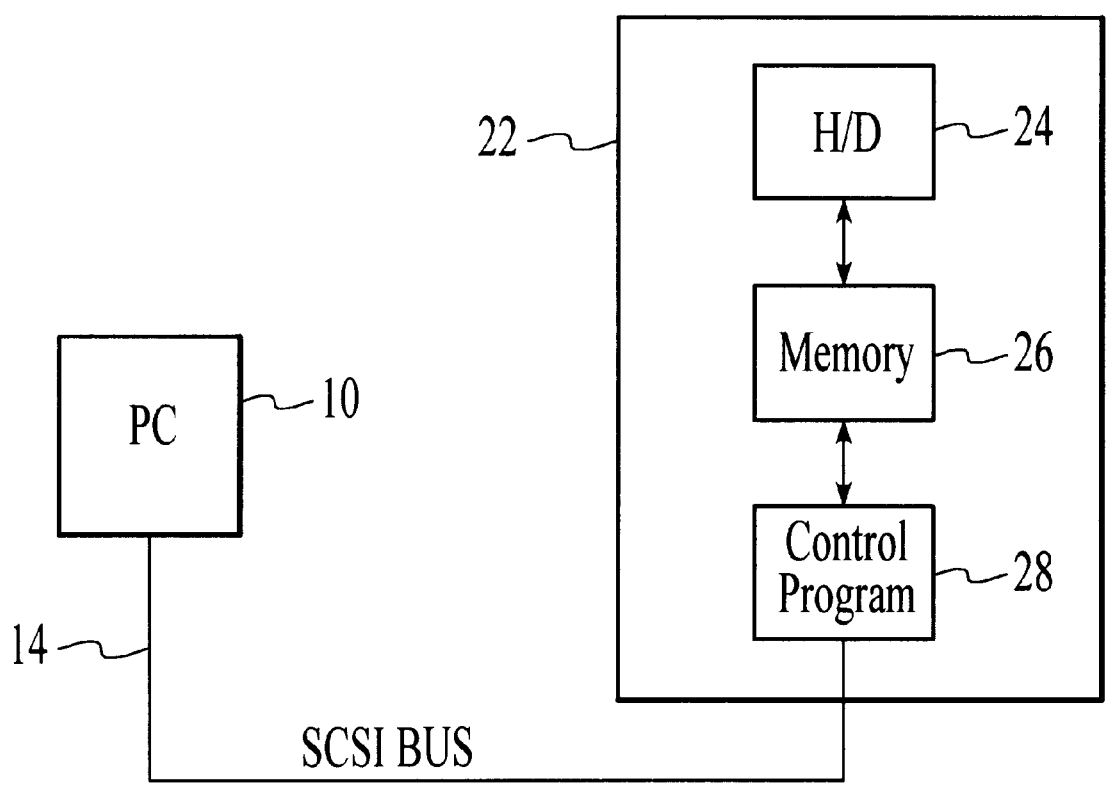
FIG. 3 is a block diagram showing the memory of a portable computer functioning as a cache in SCSI target mode according to the present invention.

Accordingly, the present invention provides for a method and system for converting the unused memory of a portable computer into a cache while the portable computer is in SCSI target mode. To more particularly illustrate the system in accordance with the present invention, refer now to FIG. 3 depicting a block diagram of one embodiment of such a system. The portable computer 22 of the present invention is shown connected to a SCSI bus 14 and includes a hard disk 24, a memory 26, and a disk control program 28.

The disk control program 28 is modified to enable the memory 26, which is interposed between the PC 10 and the larger but slower hard disk 24, to act as a high speed buffer. If data is stored in the memory 26, then it can be accessed by the PC 10 faster than if the data were stored in the slower hard drive 24. If data is not in the memory 26 when referenced, then access is made to the hard disk 24.

More specifically, when the portable 22 is placed in SCSI target mode, the PC 10 transmits SCSI commands to the portable 22 as before. According to the present invention, however, the SCSI commands are intercepted by the portable computer 22 when PC 10 attempts to query the hard disk 24, and the contents of the memory 26 are checked. If the data requested by the PC 10 is present in the memory 26, then the portable computer 22 returns the data to the PC 10 from the memory 26. If the data is not present in the memory 26, the requested data is retrieved from the hard disk 24 and returned to the PC 10. The data retrieved from the hard disk 24 is then written into the memory 26 cache for subsequent access.

The advantage of caching arises from the tendency of the PC 10 to make repeated references to the same or nearby blocks of data. Accordingly, the memory 26 of the present invention includes a read-ahead feature. When the PC 10 attempts to access the contents of a block of data not already contained in the memory 26, the read-ahead feature transfers the block of data from the hard disk 24 into the memory 26 together with immediately following blocks. The read-ahead feature enables the PC 10 to subsequently reference the requested block of data or nearby blocks of data. Since portable memories continue to increase in size, the memory 26 of the present invention provides almost limitless caching capability.

Figure 4:
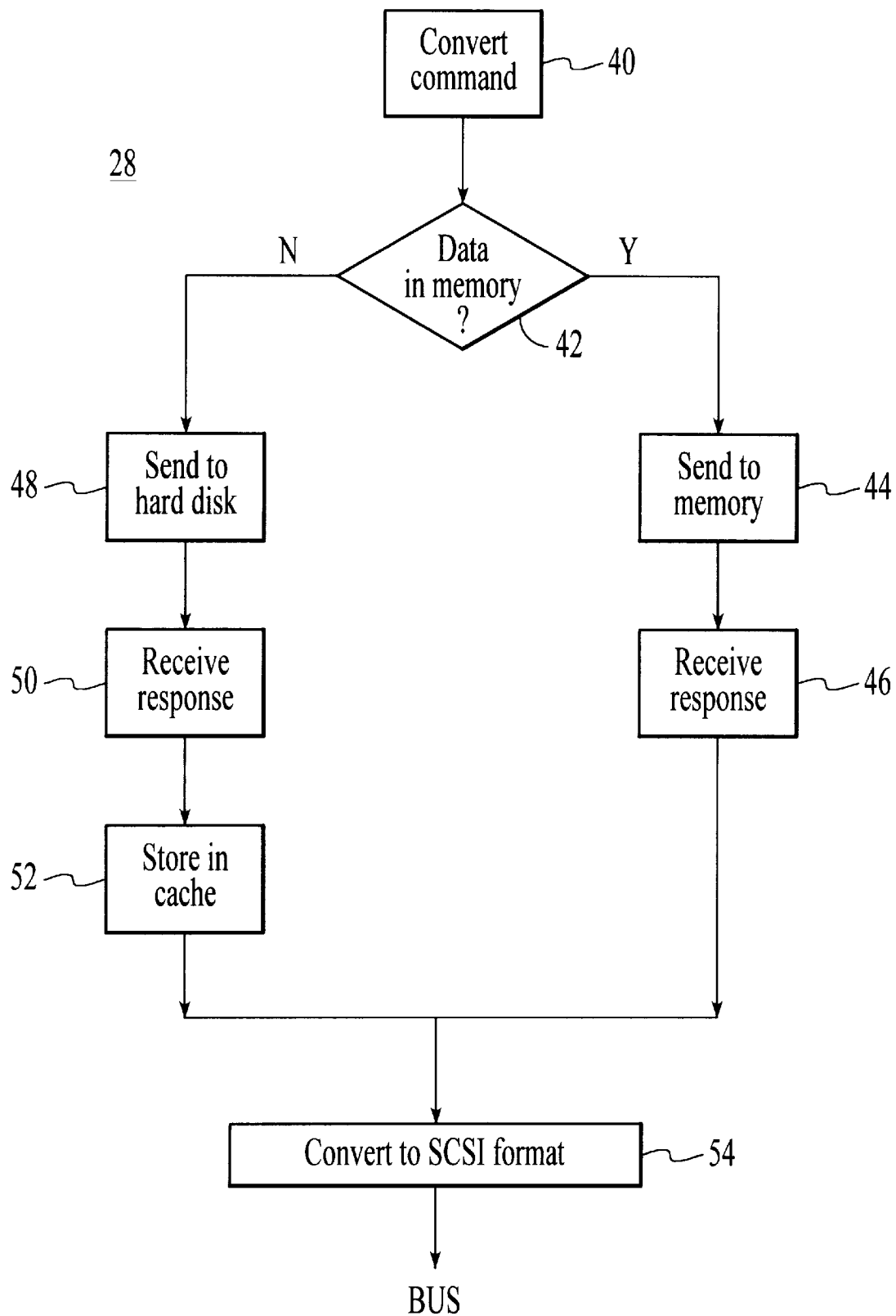
FIG. 4 is a flow chart of a disk control program of the present invention.

The memory 26 of the portable computer 22 is converted into a cache through the disk control program 28 of the present invention. Referring now to FIG. 4, a flow chart of the disk control program 28 of the present invention is shown. After reading the SCSI commands from the SCSI bus 14, the disk control program 28 converts the SCSI commands from SCSI format into the IDE format of the hard disk 24 in step 40.

Instead of sending the IDE commands directly to hard disk 24 as in prior methods, the disk control program 28 first determines if the requested data is present in the memory 26 in the case of a read command in step 42. If the requested data is present in the memory 26, then the IDE command is sent to the memory 26 in step 44, and the result is received from the memory 26 in step 46.

If the requested data is not present in the memory 26, then the IDE command is sent to the hard disk 24 in step 48, and a response is received from hard disk 24 in step 50. The data is received from the hard drive 24, the data is stored in the memory 26 with read-ahead in step 52. Finally, the requested data from either the memory 26 or the hard disk 24 is converted into SCSI format in step 54, and placed on the SCSI bus 14.

By converting the unused memory of a portable computer into a disk cache as disclosed herein, the present invention increases the resource utilization of the portable computer while reducing the response time of the portable computer. Since portable computers typically include large memories, such as twenty megabytes, for example, the present invention allows almost limitless caching, enabling the portable to perform as a very fast disk.

A system and method has been for increasing the speed of a portable computer while in SCSI target mode. Although in a preferred embodiment, the present invention is directed to SCSI target mode and SCSI format, other modes and formats may also be used. In addition, the present invention could be used to transfer data from one type of computer to a second type of computer where the memory of the second computer is unused during the transfer, such as between a mainframe and a PC, for example. Software written according the present invention is intended to reside in some form of computer readable medium, such as memory or disk.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system comprising:

a first computer;

a second computer coupled to the first computer, the second computer including a memory and a hard disk, the second computer for performing data accesses by storing data from the first computer into the hard disk and by transferring requested data from the hard disk to the first computer to extend the storage capacity of the first computer; and control program means for controlling conversion of the memory into a disk cache to act as a high speed buffer, thereby reducing the response time of the computer system during the data accesses of the hard disk by the first computer.

2. The system as in claim 1 wherein the program means further determines if the requested data is stored in the memory when the first computer attempts to access data stored in the hard disk.

3. The system as in claim 2 wherein the program means further receives the requested data from the memory when the requested data is stored in the memory, and receives the requested data from the hard disk when the requested data is not stored in the memory.

4. The system as in claim 3 wherein the program means further stores the requested data in the memory when the requested data is retrieved from the hard disk.

5. The system as in claim 1 wherein the hard disk stores data in blocks, and wherein when a first data block from the hard disk is stored into the memory, a plurality of data blocks following the first block in the hard disk are stored in the memory.

6. The system as in claim 1 wherein the control program means comprises a disk control program.

7. The system as in claim 6 wherein the disk control program resides in the second computer.

8. The system as in claim 1 wherein the first and second computers are coupled via a SCSI (small computer system interface) bus.

9. The system as in claim 8 wherein the, first computer communicates with the second computer over the SCSI bus using SCSI commands.

10. The system as in claim 9 wherein the control program means further converts the SCSI commands from the first computer into a second format, and converts the requested data into SCSI format.

11. The system as in claim 1 wherein the first computer is a personal computer and the second computer is a portable computer.

12. The system as in claim 11 wherein the portable computer is operating in SCSI target mode.

13. A method for converting a memory of a second computer into a cache in a computer system in which a first computer stores data in a hard disk of the second computer and requests data from the hard disk, the first computer communicating with the second computer using a first type of commands, the method comprising the steps of:

(a) receiving the first type of commands from the first computer;

(b) determining if requested data is stored in the memory;

(c) fetching the requested data from the memory when the requested data is the memory;

(d) when the requested data is not in the memory,
  (d1) fetching the requested data from the hard disk, and
  (d2) storing the requested data into the memory; and (e) sending the requested data to the first computer, whereby the second computer performs as a fast disk and extends the storage capacity of the first computer.

14. The method as in claim 13 wherein step (d2) further includes the step of storing the data immediately following the requested data in the hard disk into the memory.

15. The method as in claim 13 wherein the receiving step (a) further includes the step of:
  (a1) converting the first type of commands into a second type of commands.

16. The method as in claim 13 wherein the first type of commands are SCSI (small computer system interface) formatted commands, and the second type of commands are IDE (integrated drive electronics) formatted.

17. The method as in claim 14 wherein step (e) further includes the step of:
  converting the requested data into SCSI format.

18. A computer readable medium containing program instructions for converting a memory of a second computer into a cache in a computer system in which a first computer stores data in a hard disk of the second computer and requests data from the hard disk, the first computer communicating with the second computer using a first type of commands, the program instructions for:

(a) receiving the first type of commands from the first computer;

(b) determining if requested data is stored in the memory;

(c) fetching the requested data from the memory when the requested data is the memory;

(d) when the requested data is not in the memory,
    (d1) fetching the requested data from the hard disk, and
    (d2) storing the requested data into the memory; and (e) sending the requested data to the first computer, whereby the second computer performs as a fast disk and extends the storage capacity of the first computer.

19. The computer readable medium as in claim 18 wherein instruction (d2) further includes the instruction of storing the data immediately following the requested data in the hard disk into the memory.

20. The computer readable medium as in claim 18 wherein the receiving instruction (a) further includes the instruction of:
  (a1) converting the first type of commands into a second type of commands.

21. The computer readable medium as in claim 20 wherein the first type of commands are SCSI (small computer system interface) formatted commands, and the second type of commands are IDE (integrated drive electronics) formatted.

22. The computer readable medium as in claim 18 wherein instruction (e) further includes the instruction of:
  converting the requested data into SCSI format.

23. A computer system comprising:
  a bus;
  a personal computer;
  a portable computer coupled to the personal computer via the bus, the portable computer including a hard disk, the portable computer being placed in a first mode for performing data accesses by storing data from the personal computer into the hard disk and by transferring requested data from the hard disk to the personal computer to extend the storage capacity of the first computer; and
  memory means for serving as a cache for the hard disk of the portable computer to act as a high speed buffer, thereby decreasing the response time of the portable computer during the data accesses of the hard disk by the first computer.

24. The computer system as in claim 23 wherein the bus is a SCSI (small computer system interface) bus.

25. The computer system as in claim 24 further comprising a memory and a control program means of the portable computer.

26. The computer system as in claim 25 wherein the control program means further:
  determines if the requested data is stored in the memory when the personal computer attempts to access data stored in the hard disk.

27. The computer system as in claim 26 wherein the control program means further:
  receives the requested data from the memory when the requested data is stored in the memory, and receives the requested data from the hard disk when the requested data is not stored in the memory.

28. The computer system as in claim 27 wherein the control program means further stores the requested data in the memory when the requested data is retrieved from the hard disk.

29. The computer system as in claim 28 wherein the hard disk stores data in blocks, and wherein when a first data block from the hard disk is stored into the memory, a plurality of data blocks following the first block in the hard disk are stored in the memory.

30. The computer system as in claim 24 wherein the first mode is a SCSI (small computer system interface) target mode.

* * * * *